Feb. 4, 1930.                C. I. LAWDER                1,745,938
                             LIME SPREADER
                          Filed Feb. 24, 1927
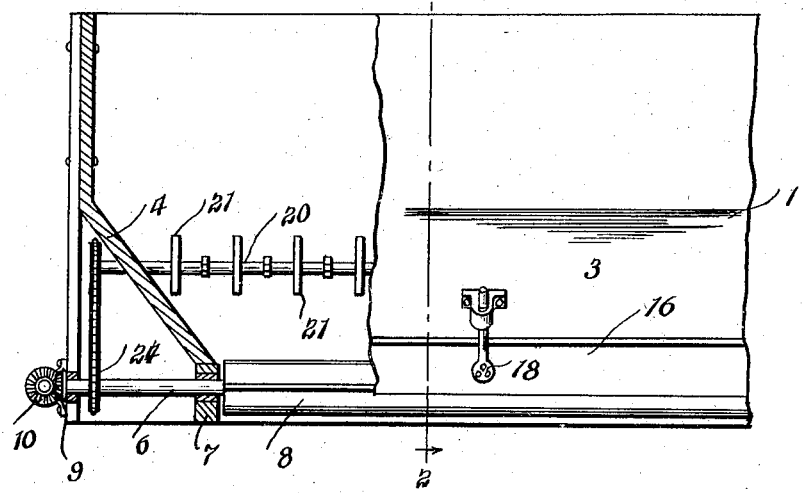
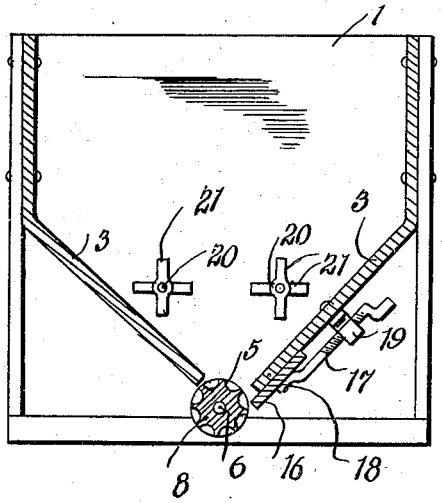
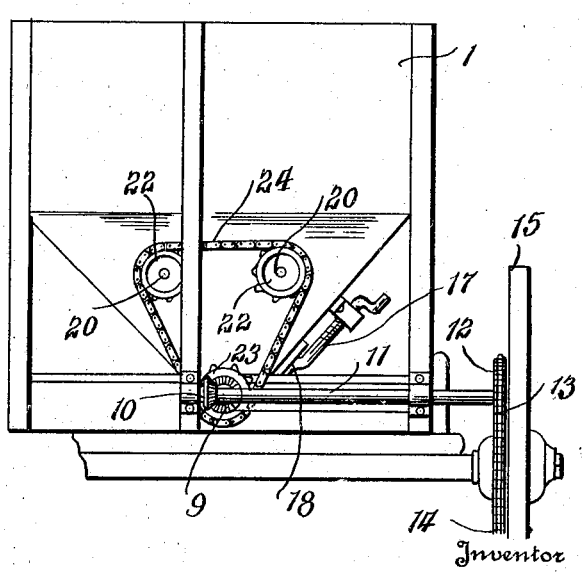
Inventor
C. I. Lawder
By Lacey & Lacey, Attorneys Patented Feb. 4, 1930

1,745,938

UNITED STATES PATENT OFFICE

CECIL I. LAWDER, OF ROCKWOOD, ILLINOIS

LIME SPREADER

Application filed February 24, 1927. Serial No. 170,606.

This invention relates to agricultural machinery and has special reference to machines for spreading lime or similar materials upon a field to be cultivated. The object of the invention is to provide a simple and compact mechanism whereby the material will be discharged onto the ground in a regulated quantity and will be prevented from clogging within the hopper. The invention is illustrated in the accompanying drawing and will be hereinafter fully set forth.

In the drawing:

Figure 1 is a side elevation, partly broken away and in section, of a portion of a spreading mechanism embodying the invention;

Fig. 2 is a transverse section on the line 2—2 of Fig. 1, and

Fig. 3 is an end elevation.

In carrying out the invention, there is provided a hopper or box 1 which is secured in any convenient or preferred manner upon a wagon running gear so as to extend longitudinally of the gear. The side walls of the hopper are made to converge downwardly in their lower portions toward the medial longitudinal line of the hopper, as shown at 3, while the lower portions of the end walls of the hopper are likewise inclined downwardly and inwardly, as shown at 4, this construction of the walls causing the material to be spread to gravitate to a longitudinal slot 5 formed between the adjacent edges of the side walls, and also clear the wagon bolster as it discharges. Immediately below the slot 5 and parallel therewith a shaft 6 is journaled in bearings 7 provided therefor at the lower ends of the end walls, and upon this shaft between the bearings is secured a feeding drum or roller 8 which is longitudinally corrugated, as clearly shown in Fig. 2. One end of the shaft 6 is equipped with a beveled pinion 9 meshing with a similar pinion 10 on the inner end of a transverse shaft 11 which is mounted in suitable bearings provided therefor on the supporting structure and has its outer end disposed laterally beyond the hopper, as shown in Fig. 3. Upon the outer end of the shaft is mounted a sprocket gear, indicated at 12, and a chain 13 is trained around the said gear and a driving sprocket 14 which is fixed to the adjacent ground wheel 15 of the running gear. By this arrangement the drum or roller 8 is rotated as the vehicle is drawn forward over the field and the material within the hopper is discharged to the ground as the successive corrugations in the drum or roller work through the lower portion of the material.

One side wall of the hopper extends to the roller or drum 8 so that the material can not escape between the said wall and the drum while the opposite wall is spaced a greater distance from the drum to permit discharge of the material, and to prevent excessive or too rapid outflow of the material a gate 16 is mounted on the last-mentioned wall at the lower edge thereof and is adjustable toward and from the roller by a screw 17 having a swiveled connection with a bracket 18 on the gate and having its upper portion mounted in a bracket or fixed nut 19 on the wall of the hopper. Rotation of the screw will adjust the gate relatively upwardly or downwardly in an obvious manner.

Extending longitudinally through the hopper above the discharge opening therein and at opposite sides of the vertical plane of said opening are agitators or beaters 20 which consist of rotatable shafts and radial arms or fingers 21 extending from the said shafts at intervals throughout the length of the same, the fingers on one shaft being preferably staggered relative to the fingers on the other shaft. The agitator shafts extend through the rear end wall of the hopper and are equipped at their rear ends with sprockets 22 about which and a similar sprocket 23 on the shaft 6 is trained a chain 24 whereby the rotation of the shaft 6 will be imparted to the agitators. It will be noted that the sprockets 22 and 23 and the chain 24 are disposed under the forwardly inclined lower portion of the rear end wall so that space is economized and this portion of the driving gearing is guarded against chance blows which might break or otherwise damage the same.

As has been said, the feeding roller or drum 8 rotates continuously as the machine is drawn over the field and, of course, the agitators also continuously rotate. The hopper is filled with the material to be spread and the rotation of the feeding drum or roller causes the troughs of the successive corrugations to receive small portions of the material and carry it past the edge of the gate 16 whence it will drop to the ground. The rotation of the agitators serves to prevent clogging of the material in the lower portion of the hopper so that it will flow evenly and smoothly to the feeding roller and will therefore, be discharged in a steady continuous stream. The material will be deposited in a thin line along the field and may be subsequently spread by hauling a drag over the same or by manual operation or by other preferred means. The spreader is exceedingly simple in its construction and compact in the arrangement of its parts so that it will operate easily and will not be apt to get out of order.

Having thus described the invention, I claim:

A spreader comprising a hopper having a tapered lower portion terminating in an outlet slot extending longitudinally of the hopper, vertical hangers carried by said hopper at the ends thereof and disposed in spaced relation to the tapered lower portion thereof, a feeding roller extending longitudinally of said hopper in operative relation to said outlet slot and having a shaft projecting from its ends and rotatably connected with said hangers, agitators in said hopper having shafts rotatably supported in the tapered lower portion thereof with their ends projecting at one end of the hopper, means carried by the shafts of said roller and agitator between one hanger and the adjacent tapered end portion of said hopper for transmitting rotary motion from the roller shaft to the agitator shafts, a drive shaft rotatably connected with the last-mentioned hanger, and means for transmitting rotary motion from said drive shaft to said roller shaft.

In testimony whereof I affix my signature.

CECIL I. LAWDER [L. S.]